United States Patent
Backes et al.

(10) Patent No.: US 12,435,053 B2
(45) Date of Patent: Oct. 7, 2025

(54) PROCESS FOR PREPARING CARYOPHYLLENE OXIDE

(71) Applicant: SYMRISE AG, Holzminden (DE)

(72) Inventors: Michael Backes, Holzminden (DE); Nadine Heinemeier, Bevern (DE); Stefan Brennecke, Halle (DE); Martin Heinemeier, Höxter (DE); Dietmar Schatkowski, Einbeck (DE); Artur Dueck, Stadtoldendorf (DE)

(73) Assignee: SYMRISE AG, Holzminden (DE)

( * ) Notice: Subject to any disclaimer, the term of this patent is extended or adjusted under 35 U.S.C. 154(b) by 1092 days.

(21) Appl. No.: 17/282,436

(22) PCT Filed: Oct. 5, 2018

(86) PCT No.: PCT/EP2018/077140
§ 371 (c)(1),
(2) Date: Apr. 2, 2021

(87) PCT Pub. No.: WO2020/069754
PCT Pub. Date: Apr. 9, 2020

(65) Prior Publication Data
US 2021/0387959 A1   Dec. 16, 2021

(51) Int. Cl.
*C07D 303/06* (2006.01)
*A61K 9/00* (2006.01)
*C07D 301/06* (2006.01)
*C07D 301/32* (2006.01)

(52) U.S. Cl.
CPC .......... *C07D 303/06* (2013.01); *A61K 9/0053* (2013.01); *C07D 301/06* (2013.01); *C07D 301/32* (2013.01); *C07B 2200/13* (2013.01)

(58) Field of Classification Search
CPC .................................................. C07D 303/06
See application file for complete search history.

(56) References Cited

PUBLICATIONS

International Search Report and Written Opinion issued on Apr. 15, 2019 or corresponding PCT Application No. PCT/EP2018/077140.
Bart Steenackers et al. "Electron Transfer-Initiated Epoxidation and Isomerization Chain Reactions of [beta]-Caryophyllene"; Chemistry—A European Journal, DE, vol. 21, No. 5, Jan. 26, 2015 (Jan. 26, 2015), pp. 2146-2156 XP055525564.
Wilhelm Treibs. "Uber das Caryophyllenoxyd, seine Darstellung durch Autoxydation des Caryophyllens and sein Vorkommen in Pflanzenolen"; Chemische Berichte, DE, vol. 80, No. 1, Jan. 1947 (Jan. 1947), pp. 56-63 XP055525604.
Skold, M. et al. "The fragrance chemical beta-caryophyllene-air oxidation and skin sensitization"; Food and Chemical Toxicology, Pergamon, GB, vol. 44, No. 4, Apr. 2006 (Apr. 2006), pp. 538-545 XP027918714.
Mihaly Matura et al. "Selected oxidized fragrance terpenes are common contact allergens"; Contact Dermatitis: Environmental and Occupational Dermatitis, US, vol. 52, No. 6, Jun. 2005 (Jun. 2005), pp. 320-328 XP055525609.
Klaudyna Fidyt et al. "[beta]-caryophyllene and [beta]-caryophyllene oxide-natural compounds of anticancer and analgesic properties"; Cancer Medicine, GB, vol. 5, No. 10, Oct. 2016 (Oct. 2016), pp. 3007-3017 XP055525698.
European Office Action issued on Apr. 20, 2022 for corresponding European Application No. 18785306.4.
Pickett, John A. et al., "Aerial oxidation of humulene," Chemistry and Industry, 1977, pp. 30-31 XP009535029.
Japanese Office Action issued Oct. 13, 2022 for corresponding Japanese Application No. 2021-518741.
Bart Steenackers et al., "Electron Transfer-Initiated Epoxidation and Isomerization ChainReactions of B-Caryophyllene," Chemistry European Journal, 2015, vol. 21, pp. 2146-2156.
Wilhelm Treibs, Article, 1947, vol. 80, pp. 56-63.
Maria Skold et al., "The fragrance chemical B-caryophyllene-air oxidation and skin sensitization," Food and Chemical Toxicology, vol. 44, 2006, pp. 538-545.
Mihaly Matura et al., "Selected oxidized fragrance terpenes are common contact allergens," Contact Dermatitis, 2005, vol. 52, pp. 320-328.
Klaudyna Fidyt et al., "B-caryophyllene and B-caryophyllene oxide-natural compounds of anticancer and analgesic properties," Cancer Medicine, 2016, vol. 5, No. 10, pp. 3007-3017.

*Primary Examiner* — David K O'Dell
(74) *Attorney, Agent, or Firm* — POLSINELLI PC

(57) ABSTRACT

The present invention relates to a method for oxidizing beta-caryophyllene with oxygen, in particular atmospheric oxygen, which avoids the use of catalysts, enzymes and solvents. Furthermore, the present invention provides a mixture comprising certain caryophyllene oxides as well as their use as a flavor and/or fragrance. The present invention also relates to products and semi-finished products comprising the mixture according to the invention.

19 Claims, No Drawings

PROCESS FOR PREPARING CARYOPHYLLENE OXIDE

CROSS-REFERENCE TO RELATED APPLICATIONS

This application is a national stage application (under 35 U.S.C. § 371) of PCT/EP2018/077140, filed Oct. 5, 2018, which is incorporated herein by reference in its entirety.

The present invention relates to a method for oxidizing beta-caryophyllene with oxygen, in particular atmospheric oxygen, which avoids the use of catalysts, enzymes and solvents. The oxidation is performed at a temperature of 60 to 150° C. over a period of time from 10 to 60 hours and the product is purified by distillation and, optionally crystallization. Furthermore, the present invention provides a mixture comprising caryophyllene oxides as well as their use as a flavor and/or fragrance. The present invention also relates to products and semi-finished products comprising the mixture according to the invention.

Beta-caryophyllene is a wide spread sesquiterpene, which occurs in cinnamon, pepper and cloves among others and is comprised in a variety of aromas and cosmetic preparations. By auto-oxidation, caryophyllene is slowly converted to the corresponding beta-caryophyllene oxides as well as further oxidized by-products.

While it was previously assumed that the oxidation of beta-caryophyllene with oxygen is very slow and requires the addition of a catalyst (*Chem. Ber.* 1947, 80, 56), today also non-catalyzed reactions with air are described, which either proceed very slowly over several weeks (Food and Chemical Toxicology 2006, 44, 538) or are supplemented with further aprotic solvents (*Chem. Eur. J.* 2015, 21, 2146). Besides the isolation from essential oils, caryophyllene oxide can be obtained by oxidation of caryophyllene using a peroxy acid (e.g. peracetic acid, meta-chloroperoxybenzoic acid) or (atmospheric) oxygen or $H_2O_2$ with the aid of a metalorganic catalyst or enzymes.

For the application in the fragrance industry, currently, a highly pure beta-caryophyllene oxide is used, which only comprises 1R,4R,6R,10S-beta-caryophyllene oxide CAS [1139-30-6] with a purity of >95%. This quality is used since a long time in a variety of aromas. Up to date, there is nothing known about the sensory properties of other isomers.

Natural caryophyllene oxide is normally produced by enzymatic oxidation of caryophyllene with the aid of hydrogen peroxide. This product is relatively expensive and it would also be desirable, if possible, to change the process to a variant without the aid of hydrogen peroxide.

It was an objective of the present invention to provide a method for oxidizing beta-caryophyllene, which avoids the use of catalysts, enzymes and co-solvents and uses oxygen, in particular atmospheric oxygen, as the sole oxidant. The conversion should also be completed within a period of time of less than a week.

The objective is met according to the invention by a method for oxidizing beta-caryophyllene comprising the steps:

(i) reacting beta-caryophyllene with oxygen, preferably atmospheric oxygen, at a temperature in a range from 60 to 150° C., preferably in a range from 80 to 130° C., particularly preferably in a range from 90 to 110° C., and (ii) optionally, heating of the obtained reaction mixture from step (i) to a temperature in a range from 110 to 150° C., preferably in a range from 115 to 125° C., and (iii) distillation of the obtained reaction mixture from step (i) or (ii) to obtain a fraction comprising caryophyllene oxides, and (iv) optionally, crystallization of the fraction comprising caryophyllene oxides from step (iii), wherein preferably no catalyst and/or no enzyme and/or no solvent is used in step (i).

In the method according to the invention, oxygen or atmospheric oxygen is used as the sole oxidant, in particular, no oxidants like e.g. peroxy acids or hydrogen peroxide are used in step (i). In addition, no catalyst, in particular no metalorganic compounds are used.

The method according to the invention can be used without food technological and food regulatory concerns because no reagents are used, which are not suitable for the application in foods and cosmetics. Advantageously, it also does not require any unusual method steps or procedures, so that it can be performed in conventional facilities without problems. The applied reagents are procedurally unproblematic and harmless to health. The method is based on the application of renewable raw materials without the use of metalorganic reagents or special oxidants.

During the oxidation in step (i), unwanted peroxides can also form. Therefore, the reaction mixture from step (i) is optionally heated in step (ii) so that present peroxides are destroyed.

In can be reasonable in this case to determine the peroxide value (PV) of the reaction mixture before and/or after performing step (ii) as described further below.

In step (i) of the method according to the invention, three different diastereoisomers of caryophyllene oxide, i.e. (1R,4R,6R,10S)-caryophyllene oxide [CAS 1139-30-6] (compound (1)), (1R,4R,6S,10S)-isocaryophyllene oxide [CAS 60594-22-1] (compound (2)) and (1R,4S,6S,10S)-caryophyllene oxide [CAS 103475-43-0] (compound (3)) are formed, as shown in scheme 1. In case there are any discrepancies between the designations and the structural formulae, the structural formulae are decisive. This applies to all compounds mentioned herein Scheme 1: Air oxidation of beta-carophyllene to the caryophyllene oxides (1), (2), and (3).

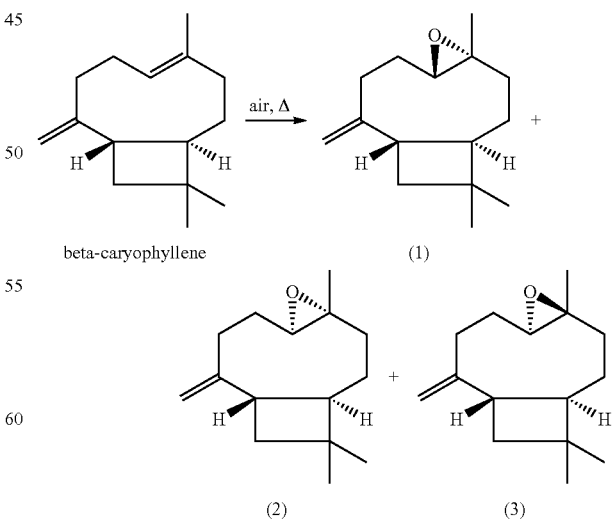

Therefore, a method as described above is preferred, wherein in step (i), a mixture of compounds (1), (2) and (3)

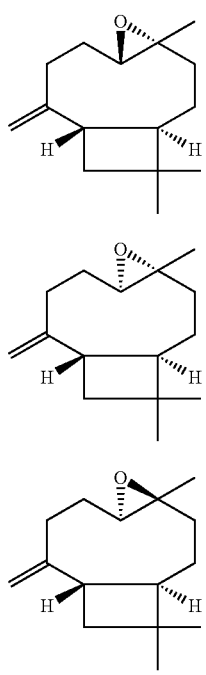

(1)

(2)

(3)

is formed and/or the fraction obtained in step (iii), comprises or consists of the compounds (1), (2) and (3).

The oxidation in step (i) is performed for so long until a noticeable decrease in reaction speed sets in. Depending on the amount of air used and the temperature, the typical reaction time is between 10 and 60 hours, particularly preferably between 15 and 40 hours, depending on reactor geometry, air flow and filling height. Preferably, after this period of time, the ratio of not converted caryophyllene to all three caryophyllene oxides is 4:1 to 1:4, particularly preferably 2:1 to 1:2.

Preferred according to the invention is therefore a method as described above, wherein the reaction in step (i) is performed for a period of time from 10 to 60 hours, preferably 15 to 40 hours and/or wherein the reaction in step (i) is performed for so long until the ratio of not converted beta-caryophyllene to the sum of compounds (1), (2) and (3) is 4:1 to 1:4, particularly preferably 2:1 to 1:2.

The ratio of caryophyllene to the caryophyllene oxides is preferably determined by gas chromatography with a flame ionization detector (GC FID) in GC FID area percent. To this end, for example the following setup can be used: Agilent 6890 (Agilent Technologies, Santa Clara, USA) column type: DB-wax (length, 20 m; inner diameter, 0.18 mm; film, 0.18 μm); flow rate: 1.3 ml min$^{-1}$ (17 min)-0.5 ml min$^{-1}$-3.0 ml min$^{-1}$; Injector, Split ratio 1/70, temperature program (Injector): 80° C.-12° C./s-250° C.; temperature program (Oven): 60° C.-9° C./min-240° C.; carrier gas, H2; detector, FID, 275° C. (Agilent Technologies, Santa Clara, USA).

In was observed that longer oxidation times only led to the reaction becoming significantly slower and the caryophyllene being further used up but no significant amounts of caryophyllene oxide being formed. This may be due to an over-oxidation. It therefore proved reasonable to perform the oxidation within the above mentioned period of time or to terminate as soon as the above defined educt/product ratio is reached.

To guarantee good yields of the desired caryophyllene oxide, also the amount of supplied oxygen or air in step (i) is important. It was observed that with too little amount of air, the yield was often too low, while larger amounts of air lead to the formation of by-products or decomposition of the formed desired products.

Further preferred is therefore a method as described above, wherein in step (i) a gassing with pure oxygen or preferably with ambient air is performed and/or wherein the supplied amount of oxygen or air is in a range from 10 to 1000 l/h per kg of educt, preferably in a range from 15 to 500 l/h per kg of educt, particularly preferably in a range from 20 to 150 l/h per kg educt, more particularly preferably in a range from 20 to 100 l/h per kg of educt.

As mentioned previously further above, unwanted peroxides can form during the oxidation in step (i). These can be destroyed by the optional step (ii). It can be reasonable in this case to determine the peroxide value of the reaction mixture to make sure that the amount of peroxides present is under a certain limit.

Preferred according to the present invention is therefore a method as described above, wherein in step (ii) the reaction mixture from step (i) is heated for 1 to 3 hours to 110 to 150° C., preferably 115 to 125° C. and/or wherein in step (ii) the obtained reaction mixture from step (i) is heated to 110 to 150° C., preferably 115 to 125° C., for so long until the peroxide value of the reaction mixture is less than 30 meq O/kg, preferably less than 20 meq O/kg.

When keeping to the above mentioned temperature range in step (ii), the amount of the desired caryophyllene oxides is mostly retained. If higher temperatures are used, the decomposition of the peroxides is faster but then significant losses in yield of caryophyllene oxides are caused.

The peroxide value (PV) is a measure for the content of peroxidic functional groups in the reaction mixture. It is stated as milliequivalents oxygen per kg of the reaction mixture (meq O/kg). The peroxide number is preferably determined according to the method of Wheeler.

Before the distillation in step (iii), preferably a co-solvent is added to the reaction mixture, which provides that the distillation residue can still be stirred and thereby makes the distillation easier and more efficient. Polyethylene glycol (PEG), in particular PEG 600, in a ratio of 3:1 to 1:1 (caryophyllene oxide containing mixture to PEG 600) has proven particularly preferable.

Particularly preferable is therefore also a method as described above, wherein in step (iii), before the distillation of the reaction mixture obtained in step (i) or (ii), a co-solvent is added, preferably polyethylene glycol (PEG), in particular PEG 600, and/or wherein the co-solvent is added in a ratio of 3:1 to 1:1 reaction mixture from step (i) or (ii) to co-solvent.

Subsequently, the mixture is distilled to separate off the non-volatile polymer components. The vacuum applied in this case should preferably be between 1 and 5 mbar. Particularly preferably, a fraction with highly volatile components (head temperature <100° C. at 3-5 mbar) is separated off bevor. The distillation is finished when a head temperature of 130° C. to 160° C. at 1-5 mbar is reached.

Preferred according to the invention is therefore a method as described above, wherein the distillation in step (iii) is performed at a pressure of 1 to 5 mbar and the fraction comprising caryophyllene oxides is obtained at a head temperature in a range from 100 to 160° C., preferably 100 to 130° C., and wherein optionally a head fraction at a head temperature of 75° C. to <100° C. and a pressure of 3 to 5 mbar is obtained and discarded.

The distillate can be used without further processing in the crystallization in step (iv). To obtain a particularly preferable sensory profile of the product, water in a ratio of about 3:1 (distillate:water) can alternatively be added to the obtained distillate while stirring. Subsequently, the water is distilled off again at 85-95° C. and 100-500 mbar. This procedure can be repeated if required.

Preferable is therefore also a method as described above, wherein before the crystallization in step (iv), water in a ratio of 4:1 to 2:1 fraction comprising caryophyllene oxides to water is added to the fraction comprising caryophyllene oxides obtained in step (iii) while stirring and the water is subsequently distilled off, preferably at a temperature in a range from 85 to 95° C. and at a pressure of 100 to 500 mbar.

In step (iv) of the method according to the invention, the distillate is recrystallized with a mixture of short chain alcohols (e.g. methanol, ethanol, n-propanol, isopropanol) and water. Preferable in this case is a ratio of distillate from step (iii) to alcohol/water from 3:1 to 1:3, particularly preferable from 2:1 to 1:2. Particularly good results are achieved when ethanol or isopropanol are used for recrystallization.

Therefore, a method according to the invention is particularly preferred, wherein in step (iv) the fraction comprising caryophyllene oxides from step (iii) is recrystallized with a mixture of alcohols with 1 to 3 carbon atoms, preferably ethanol and/or isopropanol, preferably wherein a ratio from 3:1 to 1:3, preferably 2:1 to 1:2, fraction comprising caryophyllene oxides from step (iii) to the mixture of alcohols with 1 to 3 carbon atoms and water is used. The ratio in this case refers to the respective weight used.

The composition of the mixture of alcohols with 1 to 3 carbon atoms and water in this case is preferably between 3:1 and 1:3, particularly preferably between 3:1 and 1:1 alcohol mixture to water. The ratio in this case refers to the respective weight used.

In step (i) of the method according to the invention, an enriched caryophyllene containing fraction—which can be obtained by distillation from cloves or clove leafs—can also be used, which besides beta-caryophyllene also comprises alpha-humulene. When such a fraction is used as educt in the method according to the present invention, a sensorially particularly advantageous mixture of oxidation products is obtained. In particular, in this case, besides the above mentioned caryophyllene oxides, also (1R,3E,7E,11R)-epoxyhumulene [CAS 19888-34-7] (compound (4)) is formed.

The present invention therefore also relates to a method as described above, wherein the beta-caryophyllene used in step (i) is present in a mixture comprising 60 to 95% beta-caryophyllene and 2 to 20% alpha-humulene, preferably 85 to 95% beta-caryophyllene and 4 to 15% alpha-humulene.

The content of beta-caryophyllene and alpha-humulene in the mixture used is in this case is preferably determined in GC-FID area percent by gas chromatography with a flame ionization detector (GC FID).

In the method described above, in this case, in step (i) a mixture is formed comprising the compounds (1), (2), (3) and (4)

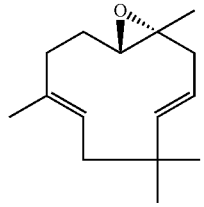

(4)

Particularly preferable in this case is a method, wherein the fraction obtained in step (iii) comprises or consist of 75 to 90% compound (1), 4 to 12% compound (2), 0.1 to 5% compound (3) and 0.1 to 5% compound (4), preferably 80 to 90% compound (1), 6 to 10 compound (2), 0.2 to 3% compound (3) and 0.5 to 3% compound (4).

The percentages are preferably determined in GC-FID area percent by gas chromatography with a flame ionization detector (GC FID).

The present invention therefore also relates to a mixture, preferably a crystalline mixture, comprising or consisting of compounds (1), (2) and (3), preferably obtained or obtainable by a method as described above or a mixture comprising or consisting of compounds (1), (2), (3) and (4), preferably obtained or obtainable by a method as described above, preferably wherein the mixture comprises or consists of 75 to 90% compound (1), 4 to 12 compound (2), 0.1 to 5% compound (3) and 0.1 to 5% compound (4), preferably 80 to 90% compound (1), 6 to 10% compound (2), 0.2 to 3% compound (3) and 0.5 to 3% compound (4).

The percentages are preferably determined in GC-FID area percent by gas chromatography with a flame ionization detector (GC FID).

The product formed is therefore different from the specification of the products on the market, which comprise >95% compound (1). As demonstrated in the Examples below, the mixture according to the invention has an improved sensory profile compared to compound (1). In addition, it was for the first time discovered that, surprisingly, also compound (2) is perceived significantly more intensely compared to compound (1) and that particularly preferable notes therein are emphasized more strongly.

Therefore, the present invention also relates to the use of a mixture as described above as a fragrance and/or flavor or the use of compound (2) as a fragrance and/or flavor.

In particular, the mixture according to the invention or compound (2) can be used to provide, convey or enhance one or more flavor and/or fragrance notes selected from citrus, woody, grapefruit, tropical fruits, e.g. mango, vegetables, e.g. herbs, carrot, hops or green tea.

The mixture according to the invention can advantageously be used in a range of products and semi-finished products as fragrance and/or flavor.

The invention therefore also relates to a preparation for nutrition, oral care or pleasure or a cosmetic or pharmaceutic preparation intended for oral application or a semi-finished product for producing a preparation for nutrition, oral care or pleasure or a cosmetic or pharmaceutic preparation intended for oral application comprising a mixture as described above.

A preparation according to the present invention comprises preferably 0.05 to 50 ppm, particularly preferably 0.1 to 20 ppm of the mixture as described above. A semi-finished product according to the invention comprises preferably 0.001 to 7.5 wt.-%, particularly preferably 0.01 to 5.0 wt.-% of the mixture as described above.

Preparations for nutrition or pleasure in the sense of the present invention are e.g. baked goods (e.g. bread, dry cookies, cakes, other bakery products), sweets (e.g. chocolates, chocolate bar products, other bar products, fruit gums, hard and soft fudge, chewing gum), alcoholic or non-alcoholic drinks (e.g. coffee, tea, wine, wine containing beverages, beer, beer containing beverages, liqueurs, spirits, brandy, fruit containing lemonades, isotonic beverages, soft drinks—nectars, fruit and vegetable juices fruit and vegetable juice preparations), instant beverages (e.g. instant cocoa beverages, instant tea beverages, instant coffee beverages), meat products (e.g. ham, fresh sausage and raw sausage preparations, seasoned or marinated fresh and pickled meat products), eggs and egg products (dry egg, egg white, yolk), cereal products (e.g. breakfast cereal, cereal bars, precooked instant rice products), dairy products (e.g. milk drinks, milk ice cream, yoghurt, kefir, cream cheese, soft cheese, hard cheese, dry milk powder, whey, butter, butter milk, partially or fully hydrolyzed milk protein containing products), products from soy protein or other soy bean fractions (e.g. soy milk and products made therefrom, soy lecithin containing preparations, fermented products such as tofu or tempe or products made therefrom, soy sauces), fruit preparations (e.g. jams, fruit ice cream, fruit sauces, fruit fillings), vegetable preparations (e.g. ketchup, sauces, dry vegetables, frozen vegetables, precooked vegetables, pickled vegetables, preserved vegetables), crunchy products (e.g. baked or fried potato chips or potato dough products, bread dough products, extrudates from corn or peanut base), products from fat or oil base or emulsions thereof (e.g. mayonnaise, remoulade, dressings, seasoning mixtures), other instant meals and soups (e.g. dry soups, instant soups, precooked soups), spices, spice mixtures, in particular seasonings, which are preferably used in snacks. The preparations in the sense of the invention can also be present in form of capsules, pills (coated or non-coated pills, enteric-coated), dragees, granulates, pellets, solid mixtures, dispersion in liquid phase, as emulsions, as powders, as solutions, as pastes or as other deglutible or chewable preparations as dietary supplements.

Pharmaceutical preparations intended for oral application in the sense of the present invention are preparations, which can be e.g. in the form of capsules, pills (coated and non-coated pills, e.g. enteric coated), dragees, granulates, pellets, solid mixtures, dispersion in liquid phase, as emulsions, as powders, as solutions, as pastes or as other deglutible or chewable preparations and can be used as prescription, pharmacy only or other medication or as dietary supplements.

Preparations for oral care in the sense of the present invention are in particular oral and/or tooth care agents such as tooth pastes, tooth gels, tooth powder, mouth wash, chewing gum and other oral care agents.

Cosmetic preparations in the context of the present invention are for example cosmetic preparations for application in areas of the body or the head such as soaps, other cleaning and care agents for the facial area or the body, facial crémes, lotions or ointments, sun screen, beard cleaning or care agents, shaving foams, soaps or gels, lipstick or other lip cosmetics or lip care agents.

As further components for a preparation for nutrition or pleasure or a semi-finished product according to the invention, conventional bases, excipients, and additives for food and semi luxury food can be comprised in a preparation according to the invention (as described above) or used for the productions of such preparations, e.g. water, mixtures of fresh or processed, plant or animal based basic or raw materials (e.g. raw, roasted, dried, fermented, smoked and/or cooked meat, bones, cartilage, fish, vegetables, fruits, herbs, nuts, vegetable or fruit juices or pastes and mixtures thereof), digestible and indigestible carbohydrates (e.g. sucrose, maltose, fructose, glucose, dextrins, amylose, amylopectin, inulin, xylanes, cellulose, tagatose), sugar alcohols (e.g. sorbitol, erythritol), natural or hydrogenated fats (e.g. tallow, lard, palm fat, coconut fat, hydrogenated plant fat), oils (e.g. sunflower oil, peanut oil, corn oil, olive oil, fish oil, soy oil, sesame oil) fatty acids or salts thereof (e.g. potassium stearate) proteinogenic or non-proteinogenic amino acids and related compounds (e.g. γ-amino butyric acid, taurine), peptides (e.g. glutathione), native or processed proteins (e.g. gelatine), enzymes (e.g. peptidases), nucleic acids, nucleotides, further flavor correcting or modulating agents for unpleasant flavor impressions or not unpleasant flavor impressions, in particular flavor modulating substances (e.g. inositol phosphate, nucleotide such as guanosine monophosphate, adenosine monophosphate or other substances such as sodium glutamates or 2-phenoxy propionic acid), emulsifiers (e.g. lecithins, diacyle glycerols, gum arabic), stabilizers (e.g. carageenan, alginate), preservatives (e.g. benzoic acid, sorbic acid), antioxidants (e.g. tocopherol, ascorbic acid), chelators (e.g. citric acid), organic or inorganic acidifiers (e.g. malic acid, acetic acid, citric acid, tartaric acid, phosphoric acid), bitters (e.g. quinine, caffeine, limonin, amarogentin, humulone, lupulone, catechins, tannins), sweeteners (e.g. saccharin, cyclamate, aspartame, neotame), mineral salts (e.g. sodium chloride, potassium chloride, magnesium chloride, sodium phosphate), substances preventing enzymatic browning (e.g. sulfite, ascorbic acid), essential oils, plant extracts, natural or synthetic dyes or color pigments (e.g. carotenoids, flavonoids, anthocyanins, chlorophyll and derivatives thereof), spices, trigeminal active substances or plant extracts comprising such trigeminal active substances, synthetic, (optionally further) natural or nature-identical aromas or flavors as well as fragrance correcting substances.

Tooth care agents (as example for preparations for oral care according to the invention) comprise in general an abrasive system (abrasive or polishing agent), such as silicic acid, calcium carbonate, calcium phosphate, aluminum oxide and/or hydroxyl apatite, surface-active substances such as sodium lauryl sulfate, sodium lauryl sarcosinate and/or cocamidopropyl betaine, moisturizers such as glycerol and/or sorbitol, thickeners such as carboxymethylcellulose, polyethylene glycols, carrageenan and/or Laponite®, sweeteners such as saccharine, flavor correcting agents for unpleasant or normally not unpleasant flavor impressions, (optionally further) flavor modulating agents (e.g. inositol phosphate, nucleotides such as guanosine monophosphate, adenosine monophosphate or other substances such as sodium glutamate or 2-phenoxy propionic acid), cooling agents such as menthol, menthol derivatives (e.g. L-menthol, L-menthyl lactate, L-methyl alkyl carbonate, menthon ketals, menthan carbonic acid amines), 2,2,2-trialkyl acetic acid amides (e.g. 2,2-diisopropyl propionic acid methyl amide), icilin derivatives and active agents such as sodium fluoride, sodium monofluorophosphate, stannous difluoride, quaternary ammonium fluorides, zinc citrate, zinc sulfate, stannous pyrophosphate, stannous dichloride, mixtures of various pyrophosphates, triclosan, cetylpyridinium chloride, aluminum lactate, potassium citrate, potassium nitrate, potassium chloride, strontium chloride, hydrogen peroxide, (optionally further) aromas and/or sodium bicarbonate or fragrance correcting agents.

Chewing gums (as further example for a preparation for oral care according to the present invention) comprise in general a chewing gum base, i.e. a chewing mass that becomes malleable when chewed, various kinds of sugars, sugar substitutes, sweeteners, sugar alcohols, flavor correcting agents or flavor modulating agents for unpleasant or normally not unpleasant flavor impressions (optionally further) flavor modulating substances (e.g. inositol phosphate, nucleotides such as guanosine monophosphate, adenosine monophosphate or other substances such as sodium glutamate or 2-phenoxy propionic acid), moisturizers, thickeners, emulsifiers, (optionally further) aromas and stabilizers and fragrance correcting agents.

In the following, the invention is explained further by individual examples.

EXAMPLE 1: OXIDATION OF CARYOPHYLLENE TO CARYOPHYLLENE OXIDE (LABORATORY SCALE)

1200 g of an enriched caryophyllene containing fraction from clove oil (comprising 89.3% beta-caryophyllene as well as 8.6% alpha-humulene) are gassed for 16 h at 120° C. with an amount of air of 180 Uh via a glass frit (160-250 µm). After this time, a ratio of non-reacted caryophyllene to the sum of all formed caryophyllene oxides of 1.4:1 was reached. Subsequently, the mixture is stirred for 2 h at 125° C. without further addition of air to destroy peroxides formed before distillation. After this heating step, the PV is at <30 meq O/kg and 450 g PEG 600 is added to the mixture and distilled with a DN 30 distillation column with 20 theoretical trays. A vacuum of 1 mbar is applied and the sump temperature is slowly increased from 130° C. to 225° C. After removing a head fraction with a head temperature of 75-100° C., a main fraction (280 g) is obtained at a head temperature between 100-103° C. The main fraction comprises 78% caryophyllene oxid (1R,4R,6R,10S & 1R,4S,6S,10S or compounds (1) & (3)) as well as 12% isocaryophyllene oxide (compound (2)) and 10% epoxyhumulene (compound (4)). The main fraction is recrystallized with 140 ml isopropanol and 70 ml water, filtrated off at 0° C., washed with isopropanol/water (2:1) and dried until mass is constant. 185.3 g of the composition (84.6% (1R,4R,6R,10S)-caryophyllene oxide [CAS 1139-30-6] (compound (1)), 8.8% (1R,4R,6S,10S)-isocaryophyllene oxide [CAS 60594-22-1] (compound (2)), 1.8% (1R,4S,6S,10S)-caryophyllene oxide [CAS 103475-43-0] (compound (3)) 1.8% ((1R,3E,7E,11R))-epoxyhumulene [CAS 19888-34-7] (compound (4)) are obtained.

Beispiel 2: Oxidation of Caryophyllene to Caryophyllene Oxide (Pilot Scale)

600 kg of an enriched caryophyllene containing fraction from clove oil (comprising 89.5% beta-caryophyllene as well as 8.2% alpha-humulene) are gassed for 30 h at 120° C. with an amount of air of 16 m$^3$/h via a gap (Ø1.2 mm). After this time, a ratio of non-reacted caryophyllene to the sum of all formed caryophyllene oxides of 1:2 was reached. Subsequently, the mixture is stirred for 2 h at 125° C. without further addition of air to destroy peroxides formed before distillation. After this heating step, the PV is at <30 meq O/kg and 280 kg PEG 600 is added to the mixture and distilled with a column with 20 theoretical trays. A final vacuum of 2 mbar is applied stepwise and the sump temperature is slowly increased to 170° C. After removing a head fraction with a head temperature of up to 105° C., a main fraction (180 kg) is obtained at a head temperature between 105-115° C. For sensory preparation, the main fraction is heated to 80° C. and 60 kg of water are added and subsequently distilled off at 500-100 mbar and 80-95° C. Subsequently, it is recrystallized with 300 l ethanol/water (2:1). The precipitate is pressed out at 5° C., washed with ethanol/water 2:1 and dried until mass is constant. 85.3 kg der of the composition (88.7% (1R,4R,6R,10S)-caryophyllene oxide [CAS 1139-30-6] (compound (1)), 8.1% (1R,4R,6S,10S)-isocaryophyllene oxide [CAS 60594-22-1] (compound (2)), 0.3% (1R,4S,6S,10S)-caryophyllene oxide [CAS 103475-43-0] (compound (3)) 1.3% ((1R,3E,7E,11R))-epoxyhumulene [CAS 19888-34-7] (compound (4)) are obtained.

Beispiel 3: Sensory Evaluation of (1R,4R,6S,10S)-Isocaryophyllene Oxide (Compound (2))

In an expert panel (n=5) the sensory impressions of the two main components are compared. To this end, a sample comprising 2 ppm caryophyllene oxide (>95% (1R,4R,6R,10S)-caryophyllene oxide [CAS 1139-30-6] (compound (1)) is compared to a sample, which comprises 2 ppm ioscaryophyllene oxide (>96% (1R,4R,6S,10S)-Isocaryophyllenoxid [CAS 60594-22-1] (compound (2)). The samples are each prepared on a 5% sugar solution. Compound (2) is evaluated as significantly more intense (5.5 to 4 on a scale to 10) than compound (1). Furthermore, the profile has stronger woody notes, which remind of grapefruit and nootkatone. Caryophyllene oxide is described as more terpenic.

Beispiel 4: Sensory Evaluation of the Mixture According to the Invention from Example 2

In an expert panel (n=6) the sensory impressions of the mixture according to the invention from example 2 are compared to currently commercially available caryophyllene oxide (>95% (1R,4R,6R,10S)-caryophyllene oxide [CAS 1139-30-6] (compound (1)). To this end, a sample of 2 ppm each of the substances to be compared are prepared on 5% sugar solution.

|  | mixture according to the invention (example 2) | (1R,4R,6R,10S)-caryophyllene oxide [CAS 1139-30-6] (compound (1)) |
| --- | --- | --- |
| impact | 5.5 | 4 |
| woody | 5 | 4 |
| comments | nootkatone, mango, adhesive | cedar wood, perfumery |

Overall, the mixture according to the invention is described as more intense, also the further descriptors provide a preferable profile for the chosen applications compared to the previously obtainable quality.

WORKING EXAMPLES

The amounts of the ingredients in the working examples are given—unless explicitly described otherwise for the respective example—in [g].

Working Example 1: Thyme Aroma—Type White

| Ingredient | amount in [G] |
| --- | --- |
| camphene | 9 |
| carvacrol | 40 |
| cymol, para | 216 |
| eucalyptol | 10 |
| limonene, D | 34 |
| linalool | 60 |

-continued

| Ingredient | amount in [G] |
|---|---|
| origanum oil | 50 |
| pinene, alpha laevo | 15 |
| pinene, beta | 7 |
| terpinene, gamma | 32 |
| terpineol, alpha | 18 |
| thymol | 500 |
| Mixture according to the invention (example 2) | 9 |

Working Example 2: Tooth Paste

| Part | Ingredient | amount in [G] |
|---|---|---|
| A | purified water | 23.08 |
|  | sorbitol (70%) | 45.00 |
|  | Solbrol ® M, sodium salt (Bayer AG, p-hydroxybenzoic acid alkylester) | 0.15 |
|  | trisodium phosphate | 0.10 |
|  | sodium monofluorophosphate | 1.12 |
|  | polyethylene glycol 1500 | 5.00 |
| B | Sident 9 (abrasive silicon dioxide) | 10.00 |
|  | Sident 22 S (thickening silicon dioxide) | 8.00 |
|  | sodium carboxymethylcellulose | 0.90 |
|  | titanium dioxide | 0.50 |
| C | purified water | 4.60 |
|  | sodium laury sulfate | 1.50 |
| D | thyme aroma - type white (working example 1) | 0.05 |

The ingredients of parts A and B are premixed separately and well stirred together under vacuum at 25 to 30° C. for 30 min. Part C is premixed and added to parts A and B, D is added and the mixture is well stirred under vacuum at 25-30° C. for 30 min. After relaxation, the tooth paste is ready and can be filled.

Working Example 3: Carrot Aroma

| Ingredient | amount in [G] |
|---|---|
| acetyl methyl carbinol | 8.00 |
| aldehyde C6 | 0.80 |
| aldehyde C8 | 0.70 |
| aldehyde C10 | 0.70 |
| bay oil | 20.00 |
| benzaldehyde | 7.00 |
| bisabolene, beta | 35.00 |
| caproic acid | 8.00 |
| caprylic acid | 15.00 |
| carene, delta-3 | 1.80 |
| caryophyllene | 95.00 |
| mixture according to the invention (example 2) | 20.00 |
| Dimethyl sulfide | 0.30 |
| ionone, beta | 9.50 |
| isovaleric acid | 5.00 |
| carrot seed oil | 45.00 |
| palmarosa oil | 3.00 |
| vegetable oil triglycerides | 350.00 |
| pinene, beta | 11.00 |
| phellandrene | 55.00 |
| triacetin | 309.20 |

Working Example 4: Melt Extrudate with Carrot Aroma

| Part | Ingredient | amount in [G] |
|---|---|---|
| A | emulsifier Dimodan HR | 10.6 |
|  | glucose syrup powder DE43-47 | 58.,2 |
|  | caramelised sugar syrup powder ERC 16000 | 5 |
|  | maltodextrin DE17-20 | 878.9 |
|  | water | 22.3 |
| B | carrot aroma (working example 3) | 25 |

The matrix substances (part A) are mixed and put on an extruder. The aroma (part B) is then dosed in during the extrusion process.

The melt extrudate obtained can for example be dosed into a dry green or black tea base at 50 g/kg.

Working Example 5: Mango Aroma

| Ingredient | amount in [G] |
|---|---|
| acetyl methyl carbinol | 48.00 |
| undecalactone, gamma | 5.00 |
| allyl caproate | 3.20 |
| bis(2-methyl-3-furfuryl)-disulfide | 0.14 |
| buchu leaf oil | 0.25 |
| caryophyllene | 16.00 |
| decalactone, gamma | 16.00 |
| dimethyl sulfide | 32.00 |
| dodecalactone, delta | 3.20 |
| ethyl acetate | 100.00 |
| ethyl butyrate | 48.00 |
| furaneol | 32.00 |
| cis-3-hexenol | 130.00 |
| cis-3-hexenyl acetate | 12.00 |
| hexenyl acetate | 1.50 |
| Isoamyl acetate | 48.00 |
| limonene D | 115.00 |
| linalyl acetate | 16.00 |
| mandarin oil (5fach) | 5.00 |
| L-menthyl acetate | 8.00 |
| menthyl furanthiol, 2, 3 | 0.02 |
| myrcene | 6.50 |
| pinene, alpha laevo | 16.00 |
| triacetin | 306.19 |
| vanillin | 16.00 |
| mixture according to the invention (example 1) | 16.00 |

Working Example 6: Spray Dried Composition Type Mango

| Ingrdient | amount in [KG] |
|---|---|
| maltodextrin DE17-20 | 700 |
| starch waxy corn Capsul | 150 |
| drinking water | 1100 |
| mango aroma (working example 5) | 200 |

The drinking water is provided in a contained and the maltodextrin and the starch are dissolved therein. Subsequently, the aroma is emulsified into the carrier solution with a Turrax. The temperature of the spray solution should not exceed 30° C. The mixture is then spray dried (desired temperature inlet: 185-195° C., desired temperature outlet: 70-75° C.).

Working Example 7: Aroma Type Green Tea

| Ingredient | amount in [G] |
|---|---|
| aldehyde C6 | 1.0 |
| geraniol | 1.0 |
| gerany lacetate | 4.3 |
| 2-trans hexenal | 18.5 |
| 3-cis-hexenol | 7.0 |
| 3-cis hexenyl acetate | 10.0 |
| hexyl acetate | 1.0 |
| linalool L | 14.5 |
| linalool oxide | 2.8 |
| linalyl acetate | 25.0 |
| tocopherol, alpha | 3.0 |
| triacetin | 883.4 |
| wintergreen oil | 25.0 |
| mixture according to the invention (working example 2) | 3.5 |

Working Example 8: Aroma Type Grapefruit

| Ingredient | amount in [G] |
|---|---|
| acetyl methyl carbinol | 8.000 |
| aldehyde C10 | 6.500 |
| ethanol | 717.945 |
| caproic acid | 10.000 |
| caryophyllene | 25.000 |
| citronella oil | 6.000 |
| decalactone, gamma | 12.500 |
| ethyl acetate | 40.000 |
| ethyl isovalerate | 25.000 |
| 2-ethyl methyl butyrate | 34.000 |
| 3-ethyl methyl thiopropionat | 15.000 |
| geraniol | 4.000 |
| grapefruit essential oil | 20.000 |
| 3-cis hexenyl butyrate | 20.000 |
| lime oil (cold-pressed) | 30.000 |
| lime oil (distilled) | 8.000 |
| 1,8-menthene thiol | 0.005 |
| methyl cinnamate | 12.000 |
| methyl thiobutyrate | 0.350 |
| nootkaton | 0.700 |
| mixture according to the invention (working example 1) | 5.000 |

Working Example 9: Aroma Type Orange

| Ingredient | Einsatz in [G] |
|---|---|
| acetaldehyde | 0.50 |
| acetaldehyde diethylacetal | 1.00 |
| aldehyde C6 | 1.50 |
| aldehyde C8 | 6.00 |
| aldehyde C9 | 0.90 |
| aldehyde C10 | 10.00 |
| aldehyde C12 | 0.50 |
| caryophyllene | 0.80 |
| citral | 6.00 |
| citronellal | 1.00 |
| citronellol | 0.50 |
| ethyl butyrate | 5.00 |
| ethyl caproate | 0.30 |
| ethyl caprylate | 0.10 |
| 2-ethyl methyl butyrate | 0.10 |
| geraniol | 0.30 |
| geranyl acetate | 0.10 |
| 2-trans hexenal | 1.50 |
| 3-cis hexenol | 0.30 |
| linalool L | 10.00 |
| nerol | 0.90 |
| nootkaton | 1.00 |
| orange oil | 933.18 |
| 1-penten-3-one | 0.02 |
| sinensal | 2.00 |
| 4-terpinenol | 1.00 |
| terpineol, alpha | 2.50 |
| valencene | 12.00 |
| mixture according to the invention (working example 2) | 1.00 |

Working Example 10: Sugar-Free Chewing Gum

| Part | Ingredient | amount in [G] | amount in [G] | amount in [G] |
|---|---|---|---|---|
| A | chewing gum base, Company "Jagum T" | 30.00 | 30.00 | 30.00 |
| B | sorbitol, pulverised | 38.45 | 38.45 | 38.50 |
|  | Isomalt ® (Palatinit GmbH) | 9.50 | 9.50 | 9.50 |
|  | xylitol | 2.00 | 2.00 | 2.00 |
|  | mannitol | 3.00 | 3.00 | 3.00 |
|  | aspartame ® | 0.10 | 0.10 | 0.10 |
|  | acesulfame ® K | 0.10 | 0.10 | 0.10 |
|  | Emulgum ® (Colloides Naturels, Inc.) | 0.30 | 0.30 | 0.30 |
| C | sorbitol, 70% | 14.00 | 14.00 | 13.45 |
|  | glycerol | 1.00 | 1.00 | 1.00 |
| D | Symcool ® WS5 | 0.05 | 0.05 | 0.05 |
|  | aroma type mango (working example 5) | 1.50 |  | 1.00 |
|  | aroma type grapefruit (working example 8) |  | 1.50 |  |
|  | aroma type orange (working example 9) |  |  | 1.00 |

Parts A to D are mixed and kneaded intensively. The raw mass can be processed to ready-to-eat chewing gums e.g. in form of this strips.

Working Example 11: Fruit Gum

| Ingredient | amount in [G] | amount in [G] | amount in [G] |
|---|---|---|---|
| water | 23.60 | 23.60 | 23.60 |
| sucrose | 34.50 | 34.50 | 34.50 |
| glucose syrup, DE 40 | 31.89 | 31.89 | 31.89 |
| Iso Syrup C* Tru Sweet 01750 (Cerestar GmbH) | 1.50 | 1.50 | 1.50 |
| gelatine 240 Bloom | 8.20 | 8.20 | 8.20 |
| yellow and red dye | 0.01 | 0.01 | 0.01 |
| citric acid | 0.20 | 0.20 | 0.20 |
| aroma type mango (working example 5) | 0.10 |  |  |
| aroma type grapefruit (working example 8) |  | 0.10 |  |
| aroma type orange (working example 9) |  |  | 0.10 |

Working Example 12: Instant Beverage

| Ingrdient | amount in [G] |
|---|---|
| sugar (sucrose) | ad 100 |
| citric acid | 12.00 |
| trisodium citrate | 0.70 |
| tricalcium phosphate | 0.60 |
| vitamin C | 0.66 |
| Grindsted ® JU 543 Stabilizer System (Danisco) | 0.90 |
| saccharin | 0.56 |
| aroma type mango (spray dried) (working example 6) | 1.10 |

45 g of this instant beverage powder were each dissolved in 1000 mL while stirring.

Working Example 13: Carbonized Soft Drink

| Ingredient | amount in [G] | amount in [G] | amount in [G] |
|---|---|---|---|
| sugar (sucrose) | 8 | 8 | 8 |
| citric acid | 0.15 | 0.15 | 0.15 |
| aroma type mango (working example 5) | 0.05 | | |
| aroma type grapefruit (working example 8) | | 0.02 | |
| aroma type orange (working example 8) | | | 0.10 |
| drinking water | ad 1000 | ad 1000 | ad 1000 |

The ingredients were mixed in the stated order and filled up to 100% with water. The mixtures are filled into glass bottles and carbonized.

The invention claimed is:

1. A method for oxidizing beta-caryophyllene comprising:
    (i) reacting 60 to 95 wt. % of beta-caryophyllene and 2 to 20 wt. % of alpha-humulene with oxygen at a temperature of 80 to 150° C. without a catalyst, without an enzyme, and without a solvent for 10 to 60 hours, and forming a reaction mixture comprising compounds (1), (2), and (3),

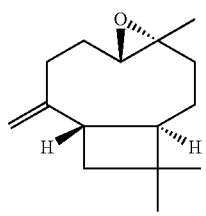

(1)

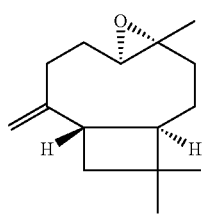

(2)

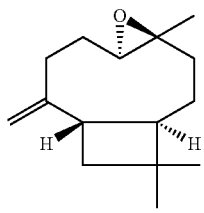

(3)

wherein the reaction is carried out until a ratio of unreacted beta-caryophyllene to a sum of the compounds (1), (2), and (3) in the reaction mixture is 4:1 to 1:4 (unreacted beta-caryophyllene:sum of compounds (1), (2), and (3));
    (ii) after carrying out the reaction of (i) and reaching the ratio of 4:1 to 1:4, heating the reaction mixture to a temperature of 110 to 150° C. until the reaction mixture has a peroxide value of less than 30 meq O/kg;
    (iii) distilling the reaction mixture to obtain a fraction comprising the compounds (1), (2), and (3); and
    (iv) optionally, crystalizing the fraction comprising the compounds (1), (2), and (3).

2. The method of claim 1, wherein pure oxygen or ambient air is supplied to the reaction in an amount of 10 to 1000 l/h per kg of educt.

3. The method of claim 1, wherein the reaction mixture is heated in (ii) for 1 to 3 hours.

4. The method of claim 1, further comprising adding a co-solvent to the reaction mixture before the distillation.

5. The method of claim 1, further comprising adding water to the fraction in a ratio of 4:1 to 2:1 (fraction:water) while stirring and subsequently removing the water by distillation.

6. The method of claim 1 comprising the crystallizing, wherein the fraction is crystallized using a mixture of alcohols with 1 to 3 carbon atoms.

7. The method of claim 1, wherein 85 to 95% of the beta-caryophyllene and 4 to 15% of the alpha-humulene are reacted.

8. The method of claim 7, wherein the reaction mixture comprises compounds (1), (2), (3) and (4)

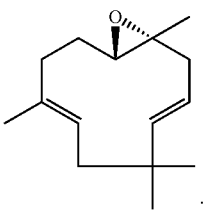

(4)

9. The method of claim 7, wherein the fraction comprises 75 to 90% of compound (1), 4 to 12% of compound (2), 0.1 to 5% of compound (3), and 0.1 to 5% of compound (4).

10. A method for oxidizing beta-caryophyllene comprising:
    (i) reacting 60 to 95 wt. % of beta-caryophyllene and 2 to 20 wt. % of alpha-humulene with oxygen at a temperature of 80 to 150° C. without a catalyst, without an enzyme, and without a solvent for 10 to 60 hours, and forming a reaction mixture comprising compounds (1), (2), and (3), (1)
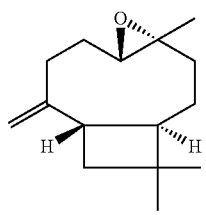

(2)
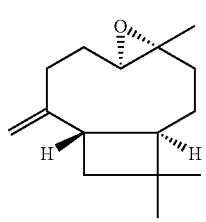

(3)
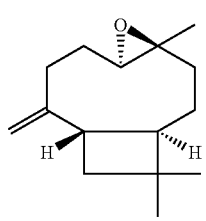

wherein the reaction is carried out until a ratio of unreacted beta-caryophyllene to a sum of the compounds (1), (2), and (3) in the reaction mixture is 4:1 to 1:4 (unreacted beta-caryophyllene:sum of compounds (1), (2), and (3));
(ii) optionally, heating the reaction mixture to a temperature of 110 to 150° C.;
(iii) adding a co-solvent to the reaction mixture and then distilling the reaction mixture with the added co-solvent to obtain a fraction comprising the compounds (1), (2), and (3),
wherein the co-solvent is polyethylene glycol and is added in a ratio of 3:1 to 1:1 (reaction mixture: polyethylene glycol); and
(iv) optionally, crystalizing the fraction comprising the compounds (1), (2), and (3).

11. The method of claim 1 comprising:
(i) reacting the beta-caryophyllene and the alpha-humulene with the oxygen at a temperature of 80 to 130° C. without the catalyst, without the enzyme, and without the solvent for 15 to 40 hours, and forming the reaction mixture comprising compounds (1), (2), and (3), (1)
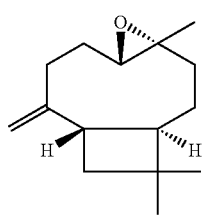

(2)
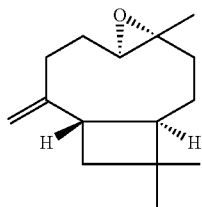

(3)
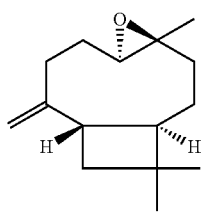

wherein the reaction is carried out until a ratio of the unreacted beta-caryophyllene to the sum of the compounds (1), (2), and (3) in the reaction mixture is 2:1 to 1:2 (unreacted beta-caryophyllene:sum of compounds (1), (2), and (3));
(ii) after carrying out the reaction of (i) and reaching the ratio of 2:1 to 1:2, heating the reaction mixture to the temperature of 110 to 150° C. until the reaction mixture has a peroxide value of less than 30 meq O/kg;
(iii) adding a co-solvent of polyethylene glycol to the reaction mixture in a ratio of 3:1 to 1:1 (reaction mixture:co-solvent), and distilling the reaction mixture with the co-solvent to obtain the fraction comprising the compounds (1), (2), and (3), and
(iv) optionally, crystalizing the fraction comprising the compounds (1), (2), and (3).

12. The method of claim 11, wherein the polyethylene glycol is PEG 600.

13. The method of claim 11, wherein the reaction mixture further comprises compound (4)

(4)
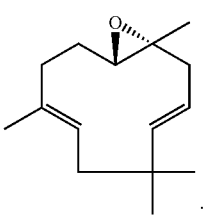

14. The method of claim 13, wherein the fraction comprises:
75 to 90% of compound (1),
4 to 12% of compound (2),
0.1 to 5% of compound (3), and
0.1 to 5% of compound (4).

15. The method of claim 13, wherein the fraction comprises:
80 to 90% compound (1),
6 to 10% compound (2),
0.2 to 3% compound (3) and
0.5 to 3% compound (4).

16. The method of claim 13 comprising the crystallizing, wherein the fraction is crystallized using a mixture of an alcohol with 1 to 3 carbon atoms and water.

17. A method for oxidizing beta-caryophyllene comprising:
(i) reacting 60 to 95 wt. % of beta-caryophyllene and 2 to 20 wt. % of alpha-humulene with oxygen at a temperature of 80 to 150° C. without a catalyst, without an enzyme, and without a solvent for 10 to 60 hours, and forming a reaction mixture comprising compounds (1), (2), and (3),

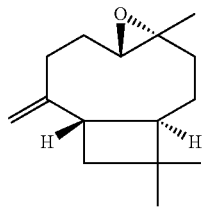

(1)

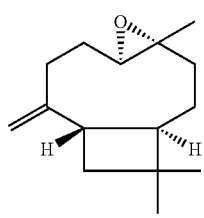

(2)

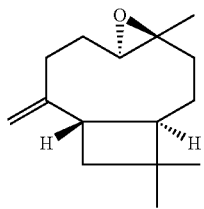

(3)

wherein the reaction is carried out until a ratio of unreacted beta-caryophyllene to a sum of the compounds (1), (2), and (3) in the reaction mixture is 4:1 to 1:4 (unreacted beta-caryophyllene:sum of compounds (1), (2), and (3));
(ii) optionally, heating the reaction mixture to a temperature of 110 to 150° C.;
(iii) distilling the reaction mixture to obtain a fraction comprising the compounds (1), (2), and (3),
wherein the distilling comprises adding a co-solvent of polyethylene glycol to the reaction mixture, and distilling the reaction mixture with the co-solvent to obtain the fraction comprising the compounds (1), (2), and (3); and
(iv) optionally, crystalizing the fraction comprising the compounds (1), (2), and (3).

18. The method of claim 17, wherein the co-solvent of polyethylene glycol is added to the reaction mixture in a ratio of 3:1 to 1:1 (reaction mixture:co-solvent).

19. The method of claim 17, wherein the polyethylene glycol is PEG 600.

* * * * *